US008699207B2

(12) United States Patent
Adzic et al.

(10) Patent No.: US 8,699,207 B2
(45) Date of Patent: Apr. 15, 2014

(54) ELECTRODES SYNTHESIZED FROM CARBON NANOSTRUCTURES COATED WITH A SMOOTH AND CONFORMAL METAL ADLAYER

(75) Inventors: Radoslav Adzic, East Setauket, NY (US); Alexander Harris, East Setauket, NY (US)

(73) Assignee: Brookhaven Science Associates, LLC, Upton, NY (US)

( * ) Notice: Subject to any disclaimer, the term of this patent is extended or adjusted under 35 U.S.C. 154(b) by 210 days.

(21) Appl. No.: 12/603,216

(22) Filed: Oct. 21, 2009

(65) Prior Publication Data

US 2010/0097742 A1  Apr. 22, 2010

Related U.S. Application Data

(60) Provisional application No. 61/107,048, filed on Oct. 21, 2008.

(51) Int. Cl.
*H01G 9/00* (2006.01)
(52) U.S. Cl.
USPC ........................................................ 361/502
(58) Field of Classification Search
USPC ................................................. 361/302, 502
See application file for complete search history.

(56) References Cited

U.S. PATENT DOCUMENTS

| | | | |
|---|---|---|---|
| 4,562,511 A * | 12/1985 | Nishino et al. | 361/324 |
| 5,698,175 A | 12/1997 | Hiura et al. | |
| 6,454,816 B1 | 9/2002 | Lee et al. | |
| 6,522,522 B2 | 2/2003 | Yu et al. | |
| 6,670,301 B2 | 12/2003 | Adzic et al. | |
| 6,697,249 B2 | 2/2004 | Maletin et al. | |
| 6,734,100 B2 | 5/2004 | Park et al. | |
| 6,750,092 B2 | 6/2004 | Won et al. | |
| 6,872,681 B2 | 3/2005 | Niu et al. | |
| 7,005,391 B2 | 2/2006 | Min et al. | |

(Continued)

FOREIGN PATENT DOCUMENTS

| | | | |
|---|---|---|---|
| JP | 2008183508 A | * | 8/2008 |
| WO | WO 2005/050682 | | 6/2005 |

OTHER PUBLICATIONS

Lu, Effect of surface modifications on the decoration of multi-walled carbon nanotubes with ruthenium nanoparticles, Apr. 18, 2007, Carbon 45 (2007), 1599-1605.*

(Continued)

*Primary Examiner* — David M Sinclair
(74) *Attorney, Agent, or Firm* — Dorene M. Price (57) ABSTRACT

High-surface-area carbon nanostructures coated with a smooth and conformal submonolayer-to-multilayer thin metal films and their method of manufacture are described. The preferred manufacturing process involves the initial oxidation of the carbon nanostructures followed by a surface preparation process involving immersion in a solution with the desired pH to create negative surface dipoles. The nanostructures are subsequently immersed in an alkaline solution containing a suitable quantity of non-noble metal ions which adsorb at surface reaction sites. The metal ions are then reduced via chemical or electrical means. The nanostructures are exposed to a solution containing a salt of one or more noble metals which replace adsorbed non-noble surface metal atoms by galvanic displacement. The process can be controlled and repeated to obtain a desired film coverage. The resulting coated nanostructures may be used, for example, as high-performance electrodes in supercapacitors, batteries, or other electric storage devices.

12 Claims, 2 Drawing Sheets

(56) References Cited

U.S. PATENT DOCUMENTS

| | | | |
|---|---|---|---|
| 7,061,749 B2 | 6/2006 | Liu et al. | |
| 7,199,997 B1* | 4/2007 | Lipka et al. | 361/502 |
| 7,209,341 B2 | 4/2007 | Yoshitake et al. | |
| 7,261,941 B2 | 8/2007 | Iijima et al. | |
| 7,382,603 B2* | 6/2008 | Timonov et al. | 361/503 |
| 7,438,949 B2* | 10/2008 | Weidman | 427/250 |
| 7,508,650 B1* | 3/2009 | Bluvstein et al. | 361/502 |
| 7,986,509 B2* | 7/2011 | Seymour | 361/502 |
| 2004/0048744 A1 | 3/2004 | Iijima et al. | |
| 2005/0112450 A1* | 5/2005 | Wang et al. | 429/44 |
| 2006/0028787 A1* | 2/2006 | Yoshida et al. | 361/523 |
| 2006/0135359 A1 | 6/2006 | Adzic et al. | |
| 2006/0263675 A1 | 11/2006 | Adzic et al. | |
| 2007/0003469 A1 | 1/2007 | Azami et al. | |
| 2007/0031722 A1 | 2/2007 | Adzic et al. | |
| 2007/0264189 A1 | 11/2007 | Adzic et al. | |
| 2007/0271751 A1* | 11/2007 | Weidman | 29/25.03 |
| 2008/0254362 A1* | 10/2008 | Raffaelle et al. | 429/188 |
| 2011/0014550 A1* | 1/2011 | Jiang et al. | 429/528 |

OTHER PUBLICATIONS

Ghodbane et al., Study of the Electroless Deposition of Pd on Cu-Modified Graphite Electrodes by Metal Exchange Reaction, Apr. 26, 2008, Chem. Mater. 2008, 20, 3495-3504.*

B.E. Conway in "Electrochemical Supercapacitors: Scientific Fundamentals and Technological Applications," Kluwer Academic/Plenum Publishers, NY (2003), Table of Contents, Chapter 9 (pp. 183-220), Chapter 11 (pp. 259-297), and Chapter 21 (pp. 675-683).

"Carbon Nanotubes: Advanced Topics in the Synthesis, Structure, Properties and Applications," edited by A. Jorio, G. Dresselhaus, and M.S. Dresselhaus, New York, NY Springer-Verlag (2008), Table of Contents and pp. 605-629.

S. Iijima, et al. in "Nano-aggregates of single-walled graphitic carbon nano-horns," Chem. Phys. Lett., 309, 165-170 (1999).

Y.-S. Min, et al. in "Ruthenium oxide nanotube arrays fabricated by atomic layer deposition using a carbon nanotube template," Adv. Mater. 15, 1019-1022 (2003).

I.-H. Kim, et al. in "Synthesis and characterization of electrochemically prepared ruthenium oxide on carbon nanotube film substrate for supercapacitor applications," J. Electrochem. Soc. 152, A2170-A2178 (2005).

C.-M. Yang, et al. in "Nanowindow-regulated specific capacitance of supercapacitor electrodes of single-walled carbon nanohorns," J. Am. Chem. Soc. 129, 20-21 (2007), and Supporting Information pp. S1-S6.

I.-H. Kim in "Electrochemical characterization of electrochemically prepared ruthenium oxide/carbon nanotube electrode for supercapacitor application," Electrochemical and Solid-State Letters, 8, A369-A372 (2005).

H.H. Kung, et al. in "Nanotechnology: applications and potentials for heterogeneous catalysis," Catalysis Today, 97, 219-224 (2004).

S.R. Brankovic, et al. in "Metal monolayer deposition by replacement of metal adlayer on electrode surfaces," Surf. Sci. 474, L173-L179 (2001).

J.X. Wang, et al. in "In situ X-ray reflectivity and voltammetry study of Ru(0001) surface oxidation in electrolyte solutions," J. Phys. Chem. B, 105 2809-2814 (2001).

Jeong, I. et al., "Hybridization of GaAs, AlAs and (Al, Ga)As with Carbon Nanotubes by Molecular Beam Epitaxy," *Physica Status Solidi (c)*, vol. 3, pp. 544-547, 2006 and supplementary information, pp. 1-5 [online] [Retrieved Oct. 10, 2012] from the Internet <URL:http://onlinelibrary.wiley.com/doi/10.1002/pssc.200564180/abstract;jsessionid=911FB18D23CD4CC1CFA46E9F1316AB98.d01t04>.

Wang, J., et al., "Lattice Fringe Signatures of Epitaxy on Nanotubes," pp. 1-4, 2006, [online] [retrieved Oct. 10, 2012] from the Internet <URL: http://arxiv.org/pdf/cond-mat/0603312v1.pdf>.

* cited by examiner

ELECTRODES SYNTHESIZED FROM CARBON NANOSTRUCTURES COATED WITH A SMOOTH AND CONFORMAL METAL ADLAYER

CROSS-REFERENCE TO RELATED APPLICATION

This application claims the benefit of U.S. Provisional Application No. 61/107,048, filed Oct. 21, 2008, which is incorporated herein by reference in its entirety.

STATEMENT OF GOVERNMENT LICENSE RIGHTS

This invention was made with Government support under contract number DE-AC02-98CH10886, awarded by the U.S. Department of Energy. The Government has certain rights in the invention.

BACKGROUND OF THE INVENTION

I. Field of the Invention

This invention relates generally to the field of energy storage devices. In particular, the present invention relates to the controlled deposition of smooth and conformal thin metal films on high-surface-area carbon nanostructures. This invention further relates to the use of these nanostructures for supercapacitor electrodes.

II. Background of the Related Art

In its simplest form, a capacitor is an energy storage device comprised of two conducting plates separated by an insulating layer. When a voltage is applied to the plates, positive and negative charges are induced on opposite surfaces and an electric field is generated. The ability of a capacitor to store electrical charge is defined as its capacitance which is directly proportional to the polarizability of the insulating layer and the surface area of the plates, but is inversely proportional to the separation between the plates. Thus, the larger the plate surface area, the greater the polarizability of the insulating medium; and, the smaller the plate separation, the greater the resulting capacitance.

Batteries are another type of energy storage device which generally produces electrical energy by the oxidation and reduction of electrochemical reagents within the battery. In this case the energy storage and conversion process is Faradaic since electron transfer between the electrodes occurs. Charge storage in capacitors is generally non-Faradaic since the storage of electrical charge is fully electrostatic with no electron transfer occurring across the electrode interface. While batteries are capable of attaining high energy densities over a wide range of voltages, they cannot attain high power densities and can only undergo a limited number of recharge cycles. Capacitors can provide high energy transfer rates with a nearly unlimited number of recharge cycles, but have limited charge storage capabilities.

Advances in energy storage devices eventually led to the development of the electric double-layer capacitor which is also known as an electrochemical capacitor or supercapacitor. A supercapacitor is an electrochemical energy storage device which combines the high energy storage capabilities of a battery with the high power and nearly unlimited recharging cycles attainable with a capacitor. A comprehensive review of the development and operation of supercapacitors is provided by B. E. Conway in "Electrochemical Supercapacitors: Scientific Fundamentals and Technological Applications," Kluwer Academic/Plenum Publishers, NY (2003) the entire contents of which is incorporated by reference as if fully set forth in this specification.

A supercapacitor is generally comprised of opposing porous, yet polarizable electrodes which are interspersed with an electrolyte and separated by an exceedingly thin, yet insulating and porous separator layer. The electrodes themselves are typically comprised of a porous material having a very large surface area. This assembly is situated between two opposing current collectors, each of which is in contact with an outer surface of an electrode. The exceedingly thin separator layer combined with the large surface area of the electrodes yields a device with an extraordinarily high capacitance.

Nanoporous electrode materials such as graphite, carbon fibers, charcoal, vitreous carbon, carbon aerogels, and activated carbon have previously been employed as supercapacitor electrodes. Factors which affect the charge storage efficiency of such carbon-containing electrodes include the availability of surface area for the accumulation of charge, electrolyte accessibility to intrapore surfaces, electrical conductivity within porous matrices, as well as the chemical stability and electrical conductivity of the electrode itself. Activated carbon is commonly employed as the electrode material due to its relatively large specific surface area which is on the order of 1000 to 2000 $m^2/g$. However, its small pore size (typically a few nm in diameter) makes it difficult for ions in the electrolyte to access intrapore surfaces. Furthermore, the use of insulating polymeric binders to fabricate the electrodes is detrimental to performance since it increases the resistance of the electrode.

Some of the problems associated with activated carbon may be circumvented by using carbon nanotubes as the electrode material. Carbon nanotubes are nanometer-scale cylindrical structures comprised entirely of $sp^2$ bonded carbon atoms. Although the specific surface area of carbon nanotubes may be considerably lower than that of activated carbon or carbon fiber, electrodes with a higher capacitance per unit surface area and lower internal resistance can be obtained. This is due primarily to the larger pore structure of carbon nanotube aggregates which permit greater accessibility to the available surface area. However, access to inner wall surfaces of nanotubes is inhibited by the small diameter of the tube ends and its proportionally larger length.

A still higher capacitance may be obtained using carbon nanohorns which have a structure analogous to nanotubes, but with one end of the cylindrical tube closed and the other open, resulting in a horn-like shape. Since carbon nanohorns have a more open structure, both the internal and outer surfaces of carbon may be made accessible to adsorbates. Consequently carbon nanohorns generally possess a higher specific surface area than carbon nanotubes and an average pore size (on the order of tens of nm) which is larger than both carbon nanotubes and activated carbon or carbon fibers.

From among available metal electro catalysts, ruthenium (Ru) exhibits the most potential for improving the storage capability because of its multivalent states which permit greater charge storage through an oxidation reaction wherein $Ru \rightarrow Ru^{4+}$. Furthermore, Ru remains adsorbed on the surface even after undergoing a change in oxidation state. The utilization of Ru is, however, inhibited by the high cost and scarcity of Ru as well as the toxicity of its oxides. Controlled deposition of smooth, conformal thin films of Ru in the submonolayer to multilayer thickness range is also difficult to achieve. This is primarily due to the tendency of Ru to form films having a high surface roughness with granular nanoparticles dispersed across its surface.

SUMMARY

In view of these and other considerations, there is a need to develop processes for controllably depositing submonolayer-to-multilayer smooth and conformal thin metal films onto high-surface-area nanostructures. In one embodiment, this is accomplished by a new synthetic procedure which involves the initial oxidation of a nanostructured substrate followed by cation adsorption on the oxidized substrate, electrochemical reduction of the cations, and displacement of the metal adatoms by a more noble metal. This results in the deposition of a monatomic layer of a more noble metal with improved stability, electrochemical reactivity, and reduced impurity levels. The method combines the advantages of high surface areas on nanostructured substrates with the electrocatalytical properties attainable with a metal layer having atomic-level thicknesses.

In another embodiment, an electrode comprising aggregates of carbon nanostructures conformally coated with a thin film of a transition metal is fabricated. The carbon nanostructures are preferentially carbon nanohorns and the transition metal is preferentially a noble metal which, in an especially preferred embodiment, consists of ruthenium (Ru). The film thickness is selected from the group consisting of an atomic submonolayer, monolayer, and bilayer. In still another embodiment the film thickness may comprise more than two atomic layers and is therefore a multilayer thin film. As an example, the atomic multilayer may comprise three or four atomic layers. The electrode may be used in, for example, a supercapacitor. The transition metal is deposited onto the surface of the carbon nanostructures using a method which involves initially oxidizing the surfaces of the carbon nanostructures and then forming a dipole at the surface. This is followed by the adsorption and subsequent reduction of metal ions on the surface of the carbon nanostructures. A thin film of the desired transition metal is then formed by immersing the carbon nanostructures in a salt comprising the transition metal. Since the transition metal is more noble than the adsorbed metal, deposition occurs by galvanic displacement of the adsorbed metal by the transition metal salt.

In a preferred embodiment the noble metal film comprises Ru which is deposited as a thin film onto a substrate comprising carbon nanostructures. The carbon nanostructures are preferentially carbon nanohorns, but may also comprise other carbon nanostructures such as single- or double-walled nanotubes, nanocones, fullerenes, and so forth. The conical, open structure of carbon nanohorns is advantageous in that it facilitates deposition on both inside and outside surfaces of the carbon layers forming the nanohorn. Aggregates of carbon nanohorns also provide a larger pore size distribution, thereby permitting still greater access to intrapore surfaces. The deposition process facilitates the formation of an atomic layer of the desired noble metal to thicknesses on the submonolayer, monolayer, and bilayer range.

An additional embodiment relates to the incorporation of Ru-coated nanostructures as electrodes in a supercapacitor. The higher specific surface area of carbon nanohorns combined with the charge storage capacity of its Ru-coated surface results in significant improvements to the energy and power density attainable. In one embodiment the supercapacitor comprises a first electrode which is separated from a second electrode by an electrically insulating separator layer. The first and second electrode are each comprised of carbon nanostructures coated with a contiguous atomic layer of noble metal atoms and are saturated with an electrolyte solution. The first electrode is in electrical contact with a first current collector and the second electrode is in electrical contact with a second current collector.

DETAILED DESCRIPTION

These and other objectives of the invention will become more apparent from the following description and illustrative embodiment which are described in detail with reference to the accompanying drawings. Similar elements in each figure are designated by like reference numbers and, hence, subsequent detailed descriptions thereof may be omitted for brevity. In the interest of clarity, the following terms are defined as provided below.

ACRONYMS

ALD: Atomic Layer Deposition
CVD: Chemical Vapor Deposition
MWNT: Multi-Walled NanoTube
PVD: Physical Vapor Deposition
SWNT: Single-Walled NanoTube

DEFINITIONS

Adatom: An atom located on the surface of an underlying substrate.
Adlayer: A layer of atoms adsorbed to the surface of a substrate.
Bilayer: Two layers of atoms or molecules which occupy all available surface sites on each layer and covers the entire surface of the substrate.
Catalysis: A process by which the rate of a chemical reaction is increased by means of a substance (a catalyst) which is not itself consumed by the reaction.
Electrocatalysis: The process of catalyzing a half cell reaction at an electrode surface.
Electrodeposition: Another term for electroplating.
Electrolyte: A substance comprising free ions which behaves as an electrically conductive medium.
Electroplating: The process of using an electrical current to reduce cations of a desired material from solution to coat a conductive substrate with a thin layer of the material.
Monolayer: A single layer of atoms or molecules which occupies substantially all available surface sites and covers the surface of the substrate.
Multilayer: More than one layer of atoms or molecules on the surface, with each layer being sequentially stacked on top of the preceding layer.
Nanocomposite: A material created by introducing a nanoparticulate filler material into a macroscopic sample material.
Nanohorn: A nanotube which has one end sealed and the other open to form a cone or horn-like shape.
Nanotube: A nanometer-scale tube-like structure.
Nanostructure: Any manufactured structure or particle with nanometer-scale dimensions.
Redox reaction: A chemical reaction wherein an atom, or ion undergoes a change in oxidation number. This typically involves the loss of electrons by one entity accompanied by the gain of electrons by another entity.

Submonolayer: Surface atom or molecular coverages which are less than a monolayer.

The present invention is directed to a method for controllably depositing submonolayer to multilayer smooth and conformal thin metal films onto carbon substrates. The method is particularly suitable for, but is not limited to deposition onto highly oriented pyrolytic graphite (HOPG) or carbon nanostructures such as nanoparticles, nanotubes, and/or nanohorns which possess a very high specific surface area. The deposition process is centered around a series of electrochemical reactions which, when performed sequentially, result in a smooth and continuous film with the targeted metal coverage and composition. The process offers unprecedented control over film growth and is advantageous in terms of its versatility, reproducibility, and efficient utilization of source material.

Since energy storage in an electrochemical capacitor or supercapacitor is dependent on the surface area available for charge storage or electrochemical reaction, significant advantages may be realized by utilizing high-surface-area nanostructures which are conformally coated with a smooth layer of an electroactive material. In this regard, carbon nanohorns are especially advantageous since they provide a high specific surface area, greater access to intrapore surfaces, and may be easily fabricated.

From among the electroactive metals available for use as electrodes, Ru offers the most potential for charge storage. However, as a source material Ru is expensive and its oxides are highly toxic. There is therefore a need to reduce Ru loading while simultaneously maximizing the accessible surface area. The present invention exploits the advantages inherent to Ru and carbon nanohorns by presenting a simple, yet robust method to deposit smooth and conformal thin films of Ru onto a substrate comprised of carbon nanohorns possessing a high specific surface area.

I. Carbon Nanostructure Synthesis

A variety of techniques have been developed to produce carbon nanostructures in significant quantities. These include, but are not limited to arc discharge, laser ablation, chemical vapor deposition (CVD), as well as natural combustion processes. From among these, one of the most widely used process for fabricating carbon nanostructures is the arc discharge process which involves application of a large current to a graphite electrode to produce an electric arc. Carbon nanostructures may then be collected from the soot generated by the discharge. Laser ablation involves using a pulsed laser to vaporize a graphite target in a high temperature reactor chamber under an inert gas environment. The nanostructures form on cooler surfaces within the chamber as the vaporized carbon condenses. The nanostructures formed by these process may include but are not limited to single-walled nanotubes (SWNT), multi-walled nanotubes (MWNT), nanohorns, nanocones, fullerenes, and any other type of carbon-containing nanostructure. By varying the growth conditions it is possible to form carbon nanostructures with the desired structure, size, and orientation.

CVD growth of carbon nanotubes involves initial preparation of a substrate comprising a layer of metal nanoparticles such as nickel, cobalt, iron, or combinations thereof which serve as a catalyst. The location and size of the metal nanoparticles may be controlled by standard photolithography masking techniques combined with deposition, etching, and annealing of the metal layer. The size and structure of the resulting nanotubes is influenced by the diameter and composition of the metal nanoparticles. The substrate itself is placed in a suitable reactor vessel and heated to approximately 700° C. Growth is initiated by introducing process gases such as ammonia ($NH_3$), nitrogen ($N_2$), or hydrogen ($H_2$) and a carbon-containing gas such as acetylene ($C_2H_2$), ethylene ($C_2H_4$), ethanol ($C_2H_6O$), or methane ($CH_4$) to the reactor chamber. Nanotube growth itself occurs at the sites of the metal catalysts. CVD growth of nanotubes may be supplemented by the application of a strong magnetic field (i.e., plasma-enhanced CVD) which promotes nanotube growth parallel to the direction of the magnetic field.

From among the techniques discussed above, CVD shows the most promise for the synthesis of carbon nanotubes due to its favorable cost/yield ratio and the ability to grow nanotubes directly on the desired substrate. One issue associated with CVD is the need to remove the metal catalyst following nanotube growth. This is typically accomplished by an acid treatment which has the potential to damage the nanotube structure. A comprehensive review of recent advances in the synthesis of carbon nanostructures may be found, for example, in "Carbon Nanotubes: Advanced Topics in the Synthesis, Structure, Properties and Applications," edited by A. Jorio, G. Dresselhaus, and M. S. Dresselhaus, New York, N.Y.: Springer-Verlag (2008), the entire contents of which is incorporated by reference as if fully set forth in this specification.

It was recently discovered that under certain conditions laser ablation of a graphite target rod produces carbon nanoparticles with a horn-like structure. These carbon nanostructures were termed nanohorns and were fabricated, for example, by laser ablation of a carbon target under an inert gas ambient using a $CO_2$ laser instead of a conventional Nd:YAG laser. The growth process itself was performed at room temperature in an argon (Ar) gas atmosphere at a pressure of 760 Torr as described, for example, by S. Iijima, et al. in "Nano-aggregates of single-walled graphitic carbon nanohorns," Chem. Phys. Lett., 309, 165 (1999) and U.S. Patent Application No. 2007/0003469 to T. Azami, et al. (hereinafter "Azami"), the entire contents of both of which are incorporated by reference as if fully set forth in this specification.

The resulting carbon nanohorns tend to cluster together to form spherical particles resembling a dahlia flower approximately 10 to 100 nm in diameter. The particles are comprised of aggregates of carbon nanohorns, each of which has a cone-like tubular structure that is capped at one end and open at the other. The cone tip forms an average angle of 20° and may extend up to 20 nm from the edge of the aggregate. The average length of individual nanohorns is 30 to 50 nm with a diameter of approximately 2 nm. Large quantities of these aggregates form a fine, black powder which may be used to manufacture electrodes for use in electrical devices such as capacitors.

Carbon nanohorns offer several advantages over nanotubes, both in terms of their properties and fabrication. Since conventional carbon nanotubes are generally only a few nm in diameter, access to inner wall surfaces is highly physically constrained. On the other hand, carbon nanohorns are open-ended, thereby making a larger fraction of their surface available as reaction sites. When spherical aggregates of carbon nanohorns are assembled into a three-dimensional network, fine pores on the order of tens of nanometers are formed between the aggregates themselves. These pores are larger than that found in activated carbon (which are typically only a few nm), thereby permitting greater physical access to intrapore surfaces. In addition to the increase in accessible surface area, carbon nanohorns have the added advantage of ease of synthesis since they can be easily fabricated without the aid of a catalyst.

The larger pore size of carbon nanotubes and nanohorns enables the deposition of thin conformal metal or oxide films on the surfaces of these nanostructures. The metals and their oxides may further improve the capacitance by improving the electrostatic charge storage capability (for non-Faradaic capacitors) of the surface, acting as a catalyst to facilitate chemical surface reactions (for Faradaic capacitors), and/or lowering the internal resistance of the electrodes.

II. Thin Film Growth

After synthesizing the carbon nanostructures by any of a plurality of suitable means as identified in Section I above, a thin adlayer of the desired metal is deposited onto the nanostructure surfaces to form a smooth, conformal coating. Conventionally this may be accomplished using thin film deposition techniques which include, but are not limited to, electrodeposition, atomic layer deposition (ALD), reductive chemical methods in a liquid phase, CVD, and physical vapor deposition (PVD).

A. Vapor Phase Deposition Processes

Film growth by ALD occurs through a series of low temperature surface chemical reactions wherein the substrate is exposed to alternating pulses of a precursor and reactant gas within a process chamber. The process chamber is purged with an inert gas such as nitrogen ($N_2$) between pulses. The deposition process is self-limiting with each cycle resulting in the deposition of a single atomic layer of the desired element or compound. ALD has been used to deposit Ru thin films onto carbon nanotubes as described, for example, in U.S. Pat. No. 7,005,391 to Min, et al. (hereinafter "Min") and by Y.-S. Min, et al. in "Ruthenium Oxide Nanotube Arrays Fabricated by Atomic Layer Deposition Using a Carbon Nanotube Template," Adv. Mater. 15, 1019 (2003) the entire contents of all of which are incorporated by reference as if fully set forth in this specification.

The relatively small diameter of carbon nanotubes combined with their significant lengths means that access to inside surfaces is highly physically constrained. Consequently, film growth on inner wall surfaces either does not occur or proceeds at a reduced rate compared to the outer cylindrical surface. This results in significant and undesirable nonuniformities in the Ru surface coverage.

Ru film growth by CVD generally requires elevated temperatures in order for surface reactions to proceed at appreciable rates. ALD and CVD growth of Ru thin films is complicated by nonuniformities in surface coverages and increased surface roughness during the initial stages of growth. Attempts to deposit Ru thin films with improved step coverages and reduced surface roughness by thermal and plasma-enhanced CVD are described, for example, in U.S. Pat. No. 6,734,100 to Park, et al. (hereinafter "Park") and U.S. Pat. No. 6,750,092 to Won, et al. (hereinafter "Won") the entire contents of all of which are incorporated by reference as if fully set forth in this specification. A wide variety of Ru precursor gases other than those disclosed by Min, Park, or Won may be used during gas-phase growth.

Deposition of Ru thin films by PVD techniques such as evaporation, laser-ablation, or sputtering may provide a dense, smooth layer, but are generally limited in that deposition only occurs on surfaces which have an essentially direct line-of-sight with the source material. Thus, when film growth is to be performed on three-dimensional structures, PVD techniques generally will not result in continuous, conformal thin films. ALD, CVD, and PVD techniques generally do not facilitate efficient utilization of the source material since deposition also occurs on the walls and other objects within the process chamber.

B. Electrochemical Deposition Processes

Conventional chemical thin film growth methods involve initial adsorption of metal ions on the substrate surface followed by chemical reduction by means of a reducing agent or electrical reduction by application of a reducing potential. A variety of chemical methods for depositing a metal adlayer have been described, for example, in U.S. Patent Appl. No. 2007/0264189 to Adzic, et al. (hereinafter "Adzic") which is incorporated by reference as if fully set forth in this specification. Electrodeposition of Ru oxide onto carbon nanotubes is described, for example, by I.-H. Kim (hereinafter "Kim") in "Synthesis And Characterization Of Electrochemically Prepared Ruthenium Oxide On Carbon Nanotube Film Substrate For Supercapacitor Applications," J. Electrochem. Soc. 152, A2170 (2005) which is incorporated by reference as if set forth in this specification.

In an especially preferred embodiment, Ru is deposited by a process wherein a series of steps are designed to sequentially modify the surface chemistry of the underlying carbon nanostructures and culminate in the formation of an adlayer of Ru atoms. This process involves initially oxidizing the surfaces of the carbon nano structures by any of a plurality of suitable methods which are well-known in the art. In one embodiment this includes thermal oxidation in an $O_2$ ambient which must be performed at low temperatures in order to avoid combustion of the carbon nanostructures by reaction with oxygen to form $CO_2$ at temperatures above approximately 400° C.

In another embodiment, surface oxidation of carbon is accomplished by immersion in a solution comprising, for example, a suitably strong acid. This step serves to not only oxidize the surface, but also to functionalize it and remove undesired impurity materials. This process involves ultrasonically dispersing the nanostructures in, for example, a heated bath comprising nitric acid, chlorosulfonic acid, or potassium permanganate in a dilute sulfuric acid solution as described in U.S. Pat. No. 5,698,175 to Hiur, et al. which is incorporated by reference as if fully set forth in this specification.

In yet another embodiment the surface may be oxidized by electrochemical means. Immersion in a suitable solution and application of potentials ranging from 0.7 to 1.9 V at room temperature and above may be performed to yield a suitably oxidized surface.

In still another embodiment, oxidation is performed by immersing the nanostructures into a solution of a peroxygen-containing composition comprising organic peroxyacid, inorganic peroxoacid, hydroperoxide, or a salt thereof. This is described, for example, in U.S. Pat. No. 6,872,681 to Niu, et al. the entire contents of which is incorporated by reference as if fully set forth in this specification. The process results in the formation of oxidized nanostructures which contain carbon and oxygen-containing moieties such as carbonyl, carboxyl, aldehyde; ketone, hydroxyl, phenolic, esters, lactones, quinines, and their derivatives. This process also improves the dispersability in organic or inorganic solvents and water.

The oxidation process not only produces carbon-oxygen surface groups which serve as reaction sites for the adsorption of non-noble metal ions, but may also open small holes or nanowindows in individual carbon nanohorns which may have had their open end become enclosed due to aggregate formation with other nanohorns. The size and number of holes may be controlled by adjusting the oxidation conditions. In a preferred embodiment, oxidation is performed by immersion in an aqueous $H_2SO_4$ solution as disclosed, for example, by C.-M. Yang, et al. in "Nanowindow-Regulated Specific Capacitance of Supercapacitor Electrodes of Single-Wall Carbon Nanohorns," J. Am. Chem. Soc. 129, 20 (2007), the entire content of which is incorporated by reference as if fully set forth in this specification.

Figure 1:
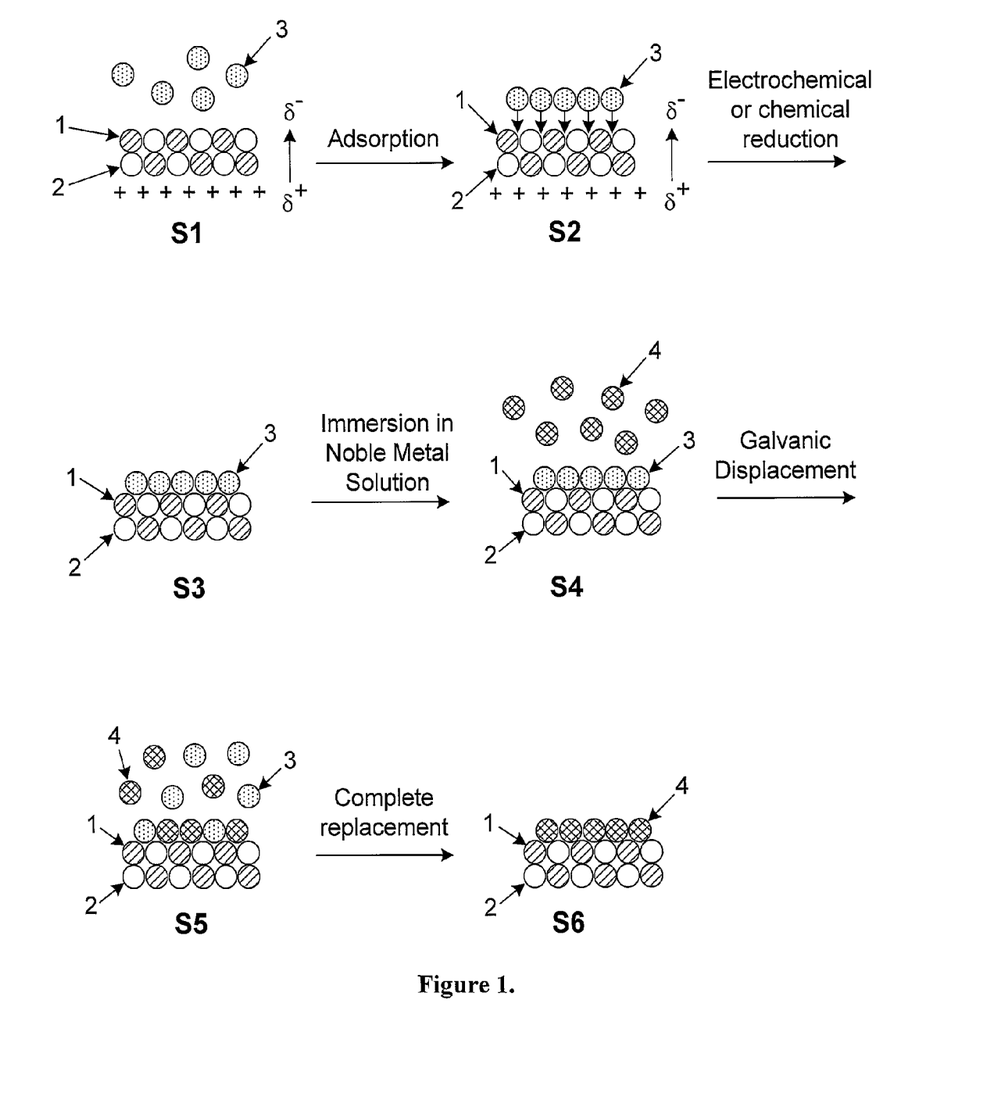
FIG. 1 illustrates the sequence of steps and accompanying surface chemical reactions which leads to deposition of a monatomic layer of the desired noble metal.

Growth of a smooth, conformal layer of the desired noble metal is accomplished by means of a sequence of electrochemical surface reactions, each of which is illustrated in FIG. 1. Once the carbon surface is suitably oxidized, non-noble metal ions are adsorbed on the surface. This is accomplished by initially immersing the carbon nanostructures in a solution which has been adjusted to a suitable pH such that a negative dipole pointing to the electrolyte is generated at the oxide surface. This may be accomplished, for example, by immersion in a 1:1 solution of sulfuric acid and nitric acid such that, as illustrated by step S1 in FIG. 1, a dipole $\delta^+ \rightarrow \delta^-$ is created on a surface comprising carbon (1) and oxygen (2) atoms. The creation of such a dipole facilitates adsorption of metal ions (3) on the surface. In addition to this simple adsorption mechanism (dipole-dipole interaction), metal ions may strongly interact with the surface to produce changes in valence state, undergo an ion-exchange process, or to form a surface complex.

Once the surface of the oxidized nanostructures has been suitably prepared, they are immersed in a solution comprising either cations or anions of a non-noble metal (also shown in step S1). The solution is prepared such that it provides a stable supply of metal salts, being neither strongly acidic or strongly alkaline. This avoids alteration of carbon surface groups and problems due to hydrolysis. The metal ions may, for example, be in the form of cations such as $Pb^{2+}$, $Zn^{2+}$, $Cu^{2+}$, $Bi^{3+}$, $Tl^+$, $Cd^{2+}$, $Ag^+$, $Sn^{2+}$, $Hg^+$, $Sb^{3+}$, $Se^{4+}$, or $Te^{4+}$ or, alternatively, their anionic forms. The metal cations (3) are attracted to the negative surface dipole $\delta^+ \rightarrow \delta^-$ such that they are adsorbed on the surface in step S2. By adjusting the solution temperature and exposure time, the desired quantity of metal cations can be adsorbed on the surface. Once this is complete, the substrate is emersed from solution and rinsed with deionized water.

Once the metal ions are adsorbed on the surface they are reduced in step S3. This may be accomplished chemically by treatment with a reducing agent such as, for example, $NaBH_4$, citric acid, hypophosphorous acid, or hydrazine. Alternatively, reduction may be accomplished electrochemically. This is done by placing the carbon substrate on an electrode which is then immersed in a suitable pH-adjusted room-temperature (e.g., approximately 25° C.) solution and subject to a suitable reducing potential. The solution is used at room temperature since desorption may occur at higher temperatures and the pH is adjusted to avoid potential problems due to hydrolysis of the metal ions. The reducing potential is typically 0.3 to 1.0 V more negative than the standard reversible potential for deposition of the corresponding cation. Reduction of the metal ions removes the positive or negative charge previously associated with the ions.

The final steps (S4-S6) involve exposing the carbon substrate to a solution (step S4) containing a salt of one or more noble metals (4) which replace the adsorbed non-noble metal (3) by galvanic displacement (steps S5 and S6). This occurs through a redox reaction wherein oxidation of the adsorbed non-noble metal (3) and reduction of the noble metal (4) contained in solution occurs simultaneously. This process results in an exchange wherein the adsorbed non-noble metal (3) is desorbed from the surface and replaced with the noble metal (4). The noble metal salt is preferentially a salt of Ru such as $RuCl_3$ or some other Ru-containing metal complex, but is not so limited and may also be Pt, Au, Pd, Ag, Rh, Os, Ir, or combinations thereof. In certain instances the displacement may produce a large number of very small Ru clusters. When such clusters are incorporated into a working electrode such as in a capacitor, the clusters themselves may become oxidized when charge storage occurs.

Each step in the overall deposition process may be adjusted to vary the resulting properties and coverage of the resulting thin film. This may be accomplished by, for example adjusting the solution pH, temperature, exposure duration, and/or concentration used at any of the preceding steps. The entire adsorption/displacement process may be repeated to obtain a desired film thickness. Once an initial metal layer is deposited it is possible to perform subsequent surface processes such as electroplating. The above-described process of adsorbing a non-noble metal ion followed by electrochemical reduction and displacement by a more noble metal is detailed by Adzic in U.S. Patent Appl. No. 2007/0264189 which is incorporated by reference as if fully set forth in this specification.

The above description provides a detailed explanation of the overall surface reaction pathways by which Ru (as well as other noble metals) may be controllably and conformably deposited onto the surface of carbon nanostructures. The resulting Ru/C nanostructures provide a large, contiguous surface of Ru atoms for surface reactions while minimizing Ru loading. The thickness of the Ru thin film may be selected from the group consisting of an atomic submonolayer, monolayer, and bilayer, but is not so limited. Under certain conditions, submonolayer coverage may not be uniform, but may take the form of two-dimensional platelets, or islands, of metal on the nanostructure substrate. Some processing conditions allow subsequent layers to be deposited preferentially on the islands, resulting in non-contiguous coverage In an additional embodiment the Ru film thickness may comprise more than two atomic layers and is therefore a multilayer thin film. The atomic multilayer may, for example, comprise three or four atomic layers. The process by which metal-coated carbon nanostructures are formed by the above deposition method will become clearer upon consideration of the following exemplary embodiment which describes preparation of Ru/C nanostructures for use as supercapacitor electrodes.

III. Exemplary Embodiment

Carbon nanostructures conformally coated with a smooth adlayer of Ru using the electrochemical deposition process described above may be used, for example, as electrodes in a supercapacitor. Initially, a suitable quantity of the desired carbon nanostructures are formed by any of the methods described in Section I. In this embodiment the nanostructures are preferentially carbon nanohorns which may be fabricated by ablation of a carbon substrate with a $CO_2$ laser at room temperature and under an ambient of Ar gas at 760 Torr as detailed in Azami. The resulting powder may then be collected and fabricated into electrodes using conventional processes which are well-known in the art.

Since nanostructured carbon and other carbonaceous materials are typically in the form of a fine powder, it is necessary to form the powder into a solid substrate for it to be physically used as an electrode. This may be accomplished, for example, by mixing the powder with a polymeric binder to form a carbon composite which can then be molded into the desired shape and heat treated. However, the use of a polymeric binder may have deleterious effects on the resulting electrical characteristics of the electrode since the binder itself is an insulating material. The use of a binder may also negatively influence the subsequent Ru/C interface.

A binder-free film comprised of carbon nanostructures may formed on a suitable current collector by electrostatic spray deposition as disclosed, for example, by Kim. This results in a thin film comprising a porous, three-dimensional interconnected network of carbon nanohorns. The current collector may comprise a carbon sheet, non-porous metal, or a conductive polymer. Preferentially the carbon nanohorns are deposited on a metallic current collector such as an aluminum foil to a thickness of several microns. The nanohorns are aggregated into a three-dimensional interconnected network comprising pores with sizes on the order of tens of nanometers to facilitate ion access to intrapore surfaces.

The carbon nanohorn electrodes are then introduced to an aqueous $H_2SO_4$ solution for several minutes to remove undesirable impurities, oxidize the carbon surfaces, and open up appropriately-sized nanowindows in enclosed nanohorn structures. After oxidation is complete the electrodes are emersed from solution and rinsed in deionized water for several minutes. This is followed by immersion in an electrolyte solution which has been adjusted to have a pH suitable to generate a negative dipole at the oxidized carbon surface which points to the electrolyte solution. The creation of a negative dipole enables the subsequent adsorption of metal cations on the surface.

Once the surface of the oxidized nanohorns has been suitably prepared, they are immersed in a solution containing $Pb^{2+}$ ions at a predetermined temperature and for a suitable time period such that a desired quantity of $Pb^{2+}$ adsorbs on the surface. The substrate is then emersed from the solution and rinsed with deionized water. After the metal ions are adsorbed on the surface they are reduced. This may be accomplished chemically by treatment with a reducing agent such as, for example, $NaBH_4$, citric acid, hypophosphorous acid, or hydrazine. Alternatively, reduction may be accomplished by electrolytical treatment. This is done by subjecting the carbon nanohorn electrode to a suitable reducing potential. The final step involves exposing the carbon nanohorn electrode to a solution containing a Ru salt which replaces the adsorbed Pb atoms by galvanic displacement. The exposure time, solution concentration and temperature may be adjusted to ensure complete replacement of Pb by Ru.

It is to be understood that variations in the sequence of steps used in the above process may be employed without varying outside the scope of the present invention. For example, carbon nanohorns may be oxidized by immersion in $H_2SO_4$ before being formed into an electrode instead of after. In another example the carbon nanohorns may be deposited or grown directly onto the current collector. In still another example, during electrochemical film growth a cation other than $Pb^{2+}$ may be used as long as it is less noble than Ru.

Figure 2:
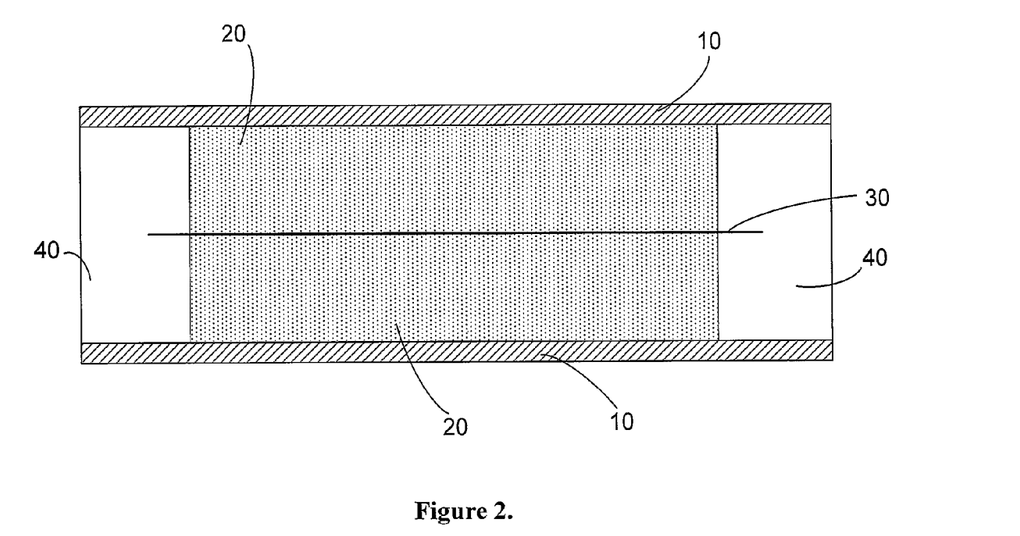
FIG. 2 is a cross-sectional schematic showing the structure of a typical supercapacitor fabricated from Ru-coated carbon nanohorn electrodes.

A cross-sectional schematic drawing (not drawn to scale) illustrating the structure of a typical supercapacitor is shown in FIG. 2. The supercapacitor comprises current collectors (10) which are in contact with a carbon nanohorn electrode (20). The carbon nanohorn electrodes (20) have been chemically processed as described above to yield a smooth and conformal thin film of Ru and hence produce Ru/C nanohorn electrodes (20). It is to be understood that FIG. 2 is provided merely for illustrative purposes; the three-dimensional porous nature of the nanohorns and the conformality of the Ru thin film is not apparent from FIG. 2. The Ru/C nanohorn electrode assembly (20) may be saturated with an electrolyte solution such that the electrodes (20) become impregnated with the electrolyte and a polarized electrode is formed. The electrolyte may be organic or inorganic with typical examples including water, ammonia, nitric acid, potassium hydroxide, and mixtures thereof.

Two Ru/C nanohorn electrodes (20) which have been prepared using the process described above are aligned such that they directly oppose each other as shown in FIG. 2. The electrodes (20) are separated by a thin separator layer (30), typically a semipermeable membrane. The separator layer (30) is electrically insulating yet permeable to ions within the electrolyte. Typical materials used for the separator layer (30) include polypropylene or some other thin semipermeable membrane. The entire assembly is bonded together and the electrolyte is circumferentially sealed by means of an annular gasket (40) which may be an electrically insulating rubber or synthetic resin.

Typical supercapacitors and their fabrication methods are disclosed, for example, in U.S. Pat. Nos. 6,454,816; 6,522,522; 6,697,249; 7,061,749; and 7,209,341 the entire contents of all of which are incorporated by reference herein in their entireties, and the teachings thereof may be utilized in carrying out the present invention. These patents and others presented in this specification describe conventional components such as current collectors, electrolytes, and separators which may be used in the present invention. These patents also present variations in supercapacitor design and operation which may also be incorporated.

By applying a positive and negative voltage to opposite current collectors (10), positive and negative ions are generated within the electrolyte (20). These ions then migrate to the respective oppositely charged current collector (10) where charge storage occurs. The improved charge storage capabilities and overall operational efficiency attainable with Ru/C-based supercapacitors will benefit potential applications in low-voltage consumer electronics such as backup power supplies for memories, microcomputers, or clocks. Higher voltage applications include electrical power load leveling, battery augmentation and pulse discharge applications such as wireless communication products or hybrid-electric and fuel-cell powered vehicles as well as residential or commercial energy storage apparatus. It is also to be understood that the uses of Ru/C nanohorn structures presented in this specification are not limited to supercapacitors, but may also find applications in fuel cells, batteries, and other electrochemical processes or energy storage devices.

It will be appreciated by persons skilled in the art that the present invention is not limited to what has been particularly shown and described in this specification. Rather, the scope of the present invention is defined by the claims which follow. It should further be understood that the above description is only representative of illustrative examples of embodiments. For the reader's convenience, the above description has focused on a representative sample of possible embodiments, a sample that teaches the principles of the present invention. Other embodiments may result from a different combination of portions of different embodiments.

The description has not attempted to exhaustively enumerate all possible variations. The alternate embodiments may not have been presented for a specific portion of the invention, and may result from a different combination of described portions, or that other undescribed alternate embodiments may be available for a portion, is not to be considered a disclaimer of those alternate embodiments. It will be appreciated that many of those undescribed embodiments are within the literal scope of the following claims, and others are equivalent.

The invention claimed is:

1. An electrode comprising an aggregate of carbon nanostructures, the carbon nanostructures conformally coated with a contiguous atomic layer of noble metal atoms, wherein the atomic layer is selected from the group consisting of a monolayer of noble metal atoms and a bilayer of noble metal atoms.

2. The electrode of claim 1, wherein the carbon nanostructures are selected from the group consisting of fullerenes, single-walled carbon nanotubes, multi-walled carbon nanotubes, and carbon nanohorns.

3. The electrode of claim 1, wherein the noble metal atoms comprise ruthenium.

4. An aggregate of carbon nanostructures, the carbon nanostructures conformally coated with a thin film of a transition metal, said thin film selected from the group consisting of a monolayer and bilayer of noble metal atoms.

5. The aggregate of claim 4 wherein the carbon nanostructures are selected from the group consisting of fullerenes, single-walled carbon nanotubes, multi-walled carbon nanotubes, and carbon nanohorns.

6. The aggregate of claim 4 wherein the transition metal is a noble metal.

7. The aggregate of claim 6 wherein the noble metal consists of ruthenium.

8. An electrode comprised of an aggregate of carbon nanohorns, the carbon nanohorns conformally coated with a contiguous atomic layer of ruthenium atoms wherein the atomic layer is selected from the group consisting of a monolayer ruthenium atoms and a bilayer of ruthenium atoms, said atomic layer of ruthenium atoms being formed using a method comprising: oxidizing a surface of the carbon nanohorns; forming a dipole at the surface of the carbon nanohorns; adsorbing metal ions on the surface of the carbon nanohorns; reducing the adsorbed metal ions; and immersing the carbon nanohorns in a solution containing a salt of ruthenium to form the atomic layer of ruthenium.

9. A supercapacitor comprising: a first electrode comprising an aggregate of carbon nanostructures, the carbon nanostructures conformally coated with a contiguous atomic layer of noble metal atoms, said first electrode being saturated with an electrolyte solution and in electrical contact with a first current collector; a second electrode comprising carbon nanostructures coated with a contiguous atomic layer of noble metal atoms, said second electrode being saturated with an electrolyte solution and in electrical contact with a second current collector; and a separator layer which electrically insulates the first electrode from the second electrode, wherein the contiguous atomic layer is selected from the group consisting of a monolayer of noble atoms and a bilayer of noble metal atoms.

10. The supercapacitor of claim 9 wherein the carbon nanostructures are selected from the group consisting of fullerenes, single-walled carbon nanotubes, multi-walled carbon nanotubes, and carbon nanohorns.

11. The supercapacitor of claim 9 wherein the noble metal consists of ruthenium.

12. An aggregate of carbon nanohorns, the carbon nanohorns conformally coated with a contiguous atomic monolayer or bilayer of ruthenium atoms.

* * * * *